(No Model.)
L. D. JUNKINS.
PNEUMATIC TIRE.
No. 603,605. Patented May 3, 1898.
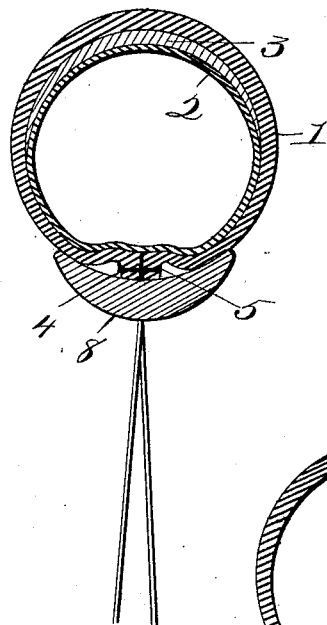
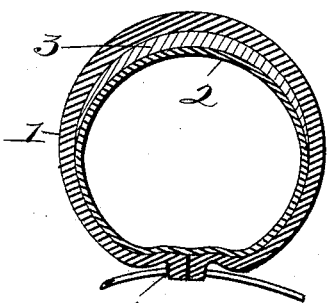
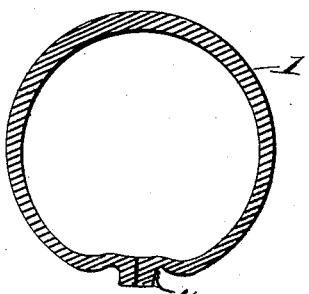
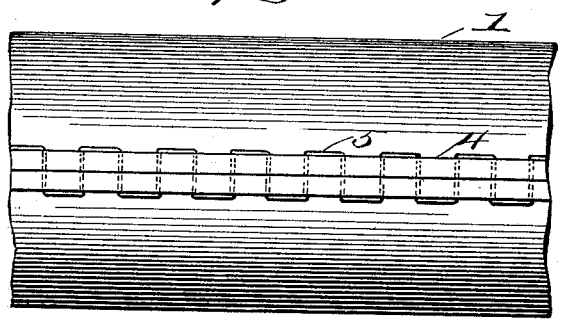
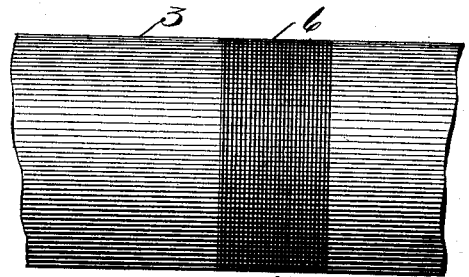
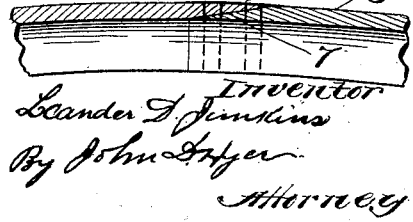
Witnesses:
J. M. Fowler Jr.
Johnson Heller
Inventor
Leander D. Junkins
By John Dryer
Attorney

UNITED STATES PATENT OFFICE.

LEANDER D. JUNKINS, OF SOMERVILLE, MASSACHUSETTS.

PNEUMATIC TIRE.

SPECIFICATION forming part of Letters Patent No. 603,605, dated May 3, 1898.

Application filed March 16, 1897. Serial No. 627,856. (No model.)

*To all whom it may concern:*

Be it known that I, LEANDER D. JUNKINS, a citizen of the United States, residing at East Somerville, in the county of Middlesex and State of Massachusetts, have invented certain new and useful Improvements in Pneumatic Tires; and I do hereby declare the following to be a full, clear, and exact description of the invention, such as will enable others skilled in the art to which it appertains to make and use the same.

The invention relates to pneumatic tires; and it consists in producing a composite tire of rubber and leather combined, certain parts of which are united to each other by vulcanization, and the rubber may be any of the known rubber compounds, or it may be a compound of rubber having an internal layer of canvas or other suitable fabric, the outer tube being formed in a peculiar manner and united by stitches, so as to bring the edges of the seam within the outer circumference of the tube.

It also consists in uniting the ends of the leather by stitching, covering the seam with a stay or saddle, and vulcanizing the same over the seam.

The object of the invention is to construct a tire that will be more durable than the tires heretofore made and that will be incapable of being punctured under any ordinary condition.

The invention will now be described in such full, clear, concise, and exact terms that any person familiar with the art may make, construct, and use the same.

Referring to the drawings forming a part of this specification, and in which like numerals indicate corresponding parts in the different views, Figure 1 is a transverse section of the tire, showing it applied to the rim of a bicycle. Fig. 2 is a like view showing the manner of forming the same. Fig. 3 is a transverse section of the outer sewed tube. Fig. 4 is a short section of the completed tube, showing the seam. Fig. 5 is a short section of the leather half-tube with the ends united and vulcanized, and Fig. 6 is a longitudinal section of Fig. 5.

1 represents the outer sewed tube of rubber or rubber compound.

2 is the inner endless and seamless tube of rubber or rubber compound, and 3 is the leather half-tube.

The outer rubber tube 1 is molded with an opening all the way around on the inner side—that is to say, the side which is in contact with the rim of the wheel when in use.

The edges of the cover 1 are formed with lips 4 adjacent to the circumferential opening, and a groove or depression is formed adjacent to each lip to prevent the needle or awl used in sewing from injuring the tube or cover while the edges are being secured together. The lips referred to are formed so as to be within a circle drawn from the central point within the open tube or cover 1, so that the tire will conform to the rim of the wheel. The open tube thus molded into form, as just described, is then stitched through the edges, as shown in Fig. 2 of the drawings, and the entire seam with its abutted and projecting edges is within the outer circumference of the tube, so that the grooving of the rim of the wheel to receive the edges is avoided, and there is no necessity to turn the tube wrong side out after being stitched, as would be the case were a lap-seam used. The rubber tube 2 and half leather tube 3, having previously been united to each other, are then inserted through the outer tube or cover 1. The edges and lips of the opening are coated with cement and then sewed together, as at 4.

The inner tube 2 is an ordinary endless tube of rubber or rubber compound.

The half-tube 3 is of leather and is of such size as to cover about half of the circumference of the inner tube 2 and about half of the inner circumference of the outer tube or cover 1.

In the manufacture of the leather half-tube 3 I take a strip of leather of suitable size and bevel or scarf the same on one side from the two edges toward the center. It is next formed into shape by means of convex and concave rolls or any other suitable way to conform to the circle and radius of the outer tube of cover 1. The ends of the leather may be skived and joined together by stitching or in any other known way, (see Fig. 6,) or the ends may be butted and a narrow strip or piece put on the under side and stitched through, when rubber is applied over the seam in either instance, and next vulcanized to strengthen and protect the same, as at Figs. 5 and 6.

From the foregoing description it will be understood that the tire comprises an endless inner tube of rubber 2, a strip of leather 3, formed to the shape and circle of the outer surface of tube 2 or to the inner surface of tube or cover 1, and an open tube or cover 1, united by stitching or other means, as has been described.

The leather half-tube 3 is preferably cemented to the inner endless tube 2 to hold it firmly in place. The circumferential seam in the outer tube or cover 1 is not vulcanized, so that it may be readily opened for repair when necessary.

It is not essential that the outer tube 1 be of rubber, as I sometimes make it of leather of the same construction and having the same function substantially as I have described for the rubber.

While I prefer to simply connect parts 2 and 3 together, I may vulcanize them together, if so desired.

A valve for inflating the tire is constructed and applied in the usual place and manner.

From the construction above described it will be apparent that the tire is practically punctureless. If a puncture should be made in the outer tube any further penetration would be avoided by the resistance offered thereto by the leather, so that the tire would not collapse.

By making the outer tube or cover with a seam it is easily taken apart for repairs, as has been already explained.

The application of rubber to the joint in the ends of the leather and vulcanizing them together makes a strong and durable seam that resists all wear and moisture.

The tire is specially adapted to bicycles, but is also designed for any use where pneumatic tires are useful or advantageous.

Minor changes may be made within the scope of the invention without materially changing the structure or sacrificing any of the advantages thereof.

Having thus fully described the invention, what I claim as new, and desire to secure by Letters Patent, is—

1. A pneumatic tire comprising an inner, endless, inflatable tube of rubber, a half-tube of leather exteriorly thereof, and an outer tube of rubber, or rubber compound formed with grooves and lips on its rim side, within its outer circle and united by stitches passed through the lips, substantially as described.

2. A pneumatic tire comprising an inner, endless, inflatable tube of rubber, an exterior half-tube of leather on the outer surface thereof, and united thereto, and an outer tube or cover of rubber or rubber compound formed with grooves and lips on its rim side within its outer circle and united by stitches passed through the lips, substantially as described.

3. A pneumatic tire, comprising an inner, endless, inflatable tube of rubber, a half-tube of leather on its outer surface, the leather half-tube having its ends united by a seam covered with rubber and vulcanized, and an exterior cover, substantially as described.

In testimony whereof I affix my signature in presence of two witnesses.

LEANDER D. JUNKINS.

Witnesses:
FRANK G. PARKER,
FRANK G. HATTIE.